United States Patent
Ovchinnikov et al.

(10) Patent No.: US 11,385,827 B1
(45) Date of Patent: Jul. 12, 2022

(54) CREATING VIRTUAL MACHINE SNAPSHOTS WITHOUT INTERFERING WITH ACTIVE USER SESSIONS

(71) Applicant: PARALLELS INTERNATIONAL GMBH, Schaffhausen (CH)

(72) Inventors: Iurii Ovchinnikov, Moscow (RU); Alexey Koryakin, Moscow (RU); Denis Lamtsov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 43 days.

(21) Appl. No.: 17/104,573

(22) Filed: Nov. 25, 2020

Related U.S. Application Data

(63) Continuation of application No. 16/426,595, filed on May 30, 2019, now Pat. No. 10,852,986, which is a
(Continued)

(51) Int. Cl.
*G06F 3/06* (2006.01)
*G06F 9/455* (2018.01)

(52) U.S. Cl.
CPC .............. *G06F 3/065* (2013.01); *G06F 3/067* (2013.01); *G06F 3/0619* (2013.01); *G06F 3/0664* (2013.01); *G06F 9/4555* (2013.01); *G06F 9/45537* (2013.01); *G06F 9/45541* (2013.01); *G06F 9/45545* (2013.01);
(Continued)

(58) Field of Classification Search
CPC ...... G06F 3/065; G06F 3/0619; G06F 3/0664; G06F 3/067; G06F 9/45537; G06F 9/45541; G06F 9/45545; G06F 9/455558; G06F 9/45533; G06F 2009/45562
See application file for complete search history.

(56) References Cited

U.S. PATENT DOCUMENTS

| 8,607,009 B2 | 12/2013 | Nicholas et al. |
| 9,122,765 B1 | 9/2015 | Chen |

(Continued)

OTHER PUBLICATIONS

V. Siripoonya and K. Chanchio, "Thread-Based Live Checkpointing of Virtual Machines," 2011 IEEE 10th International Symposium on Network Computing and Applications, 2011, pp. 155-162, doi: 10.1109/NCA.2011.28. (Year: 2011).*

(Continued)

*Primary Examiner* — Khoa D Doan
(74) *Attorney, Agent, or Firm* — Rosenberg, Klein & Lee

(57) ABSTRACT

Systems and methods for creating virtual machine snapshots. An example method comprises: receiving a request to create a snapshot of a virtual machine running on a host computer system; protecting from modification a plurality of virtual memory pages of the virtual machine; responsive to detecting an attempt to modify a virtual memory page of the plurality of memory pages, copying the virtual memory page to a queue residing in a random access memory (RAM) of the host computer system; making the virtual memory page writable; retrieving the virtual memory page from the queue; writing the virtual memory page to a disk of the host computer system; and responsive to exhausting the queue, completing creation of the snapshot of the virtual machine.

20 Claims, 6 Drawing Sheets

Related U.S. Application Data continuation of application No. 15/454,090, filed on Mar. 9, 2017, now Pat. No. 10,359,969.

(52) U.S. Cl.
CPC ...... *G06F 9/45554* (2013.01); *G06F 9/45558* (2013.01); *G06F 9/45533* (2013.01); *G06F 2009/45562* (2013.01)

(56) References Cited

U.S. PATENT DOCUMENTS

| | | |
|---|---|---|
| 2006/0085784 A1 | 4/2006 | Traut et al. |
| 2010/0122052 A1 | 5/2010 | Waldspurger et al. |
| 2013/0007389 A1 | 1/2013 | Ierson et al. |
| 2013/0024722 A1 | 1/2013 | Kotagiri et al. |
| 2013/0246725 A1 | 9/2013 | Kawamoto |
| 2015/0212956 A1 | 7/2015 | Tsirkin et al. |
| 2015/0242159 A1 | 8/2015 | Tsirkin |
| 2016/0098285 A1 | 4/2016 | Davis et al. |
| 2019/0286638 A1 | 9/2019 | Walker et al. |
| 2020/0034175 A1 | 1/2020 | Calciu et al. |

OTHER PUBLICATIONS

R. Sun, J. Yang and Z. He, "An Approach to Minimizing Downtime Induced by Taking Live Snapshot of Virtual Cluster," 2013 International Conference on Cloud and Service Computing, 2013, pp. 63-68, doi: 10.1109/CSC.2013.18. (Year: 2013).*

* cited by examiner

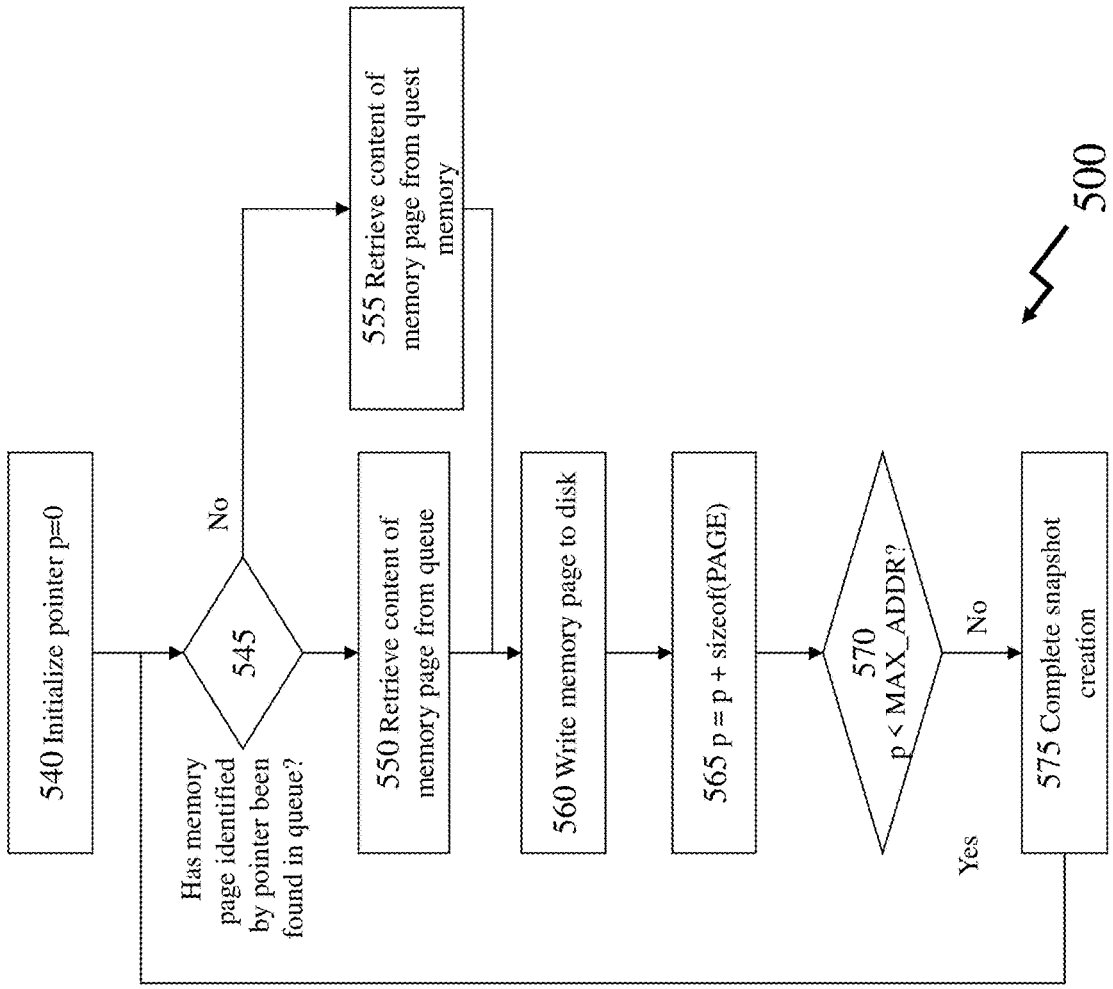
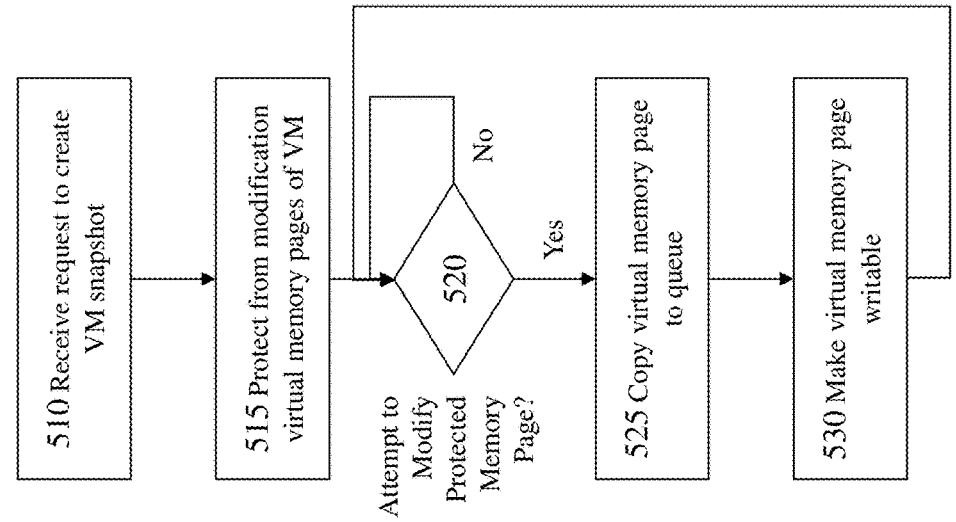
FIG. 5

CREATING VIRTUAL MACHINE SNAPSHOTS WITHOUT INTERFERING WITH ACTIVE USER SESSIONS

RELATED APPLICATIONS

This application claims the benefit of priority as a continuation of U.S. patent application Ser. No. 16/426,595 filed on May 30, 2019 entitled "Creating Virtual Machine Snapshots without Interfering with Active User Sessions" which itself claims the benefit of priority from U.S. patent application Ser. No. 15/454,090 filed on Mar. 9, 2017, entitled "Creating Virtual Machine Snapshots without Interfering with Active User Sessions," the entire contents of each being incorporated by reference herein.

TECHNICAL FIELD

The present disclosure is generally related to computer systems, and is specifically related to systems and methods for creating snapshots of virtual machines.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor," above the hardware and below the virtual machines. The virtual machine monitor may abstract the physical layer and present this abstraction to virtual machines to use, by providing interfaces between the underlying hardware and virtual devices of virtual machines. For example, processor virtualization may be implemented by the virtual machine manager scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3-5 depict flow diagrams of example methods of creating virtual machine snapshots, in accordance with one or more aspects of the present disclosure.

DETAILED DESCRIPTION

Figure 1:
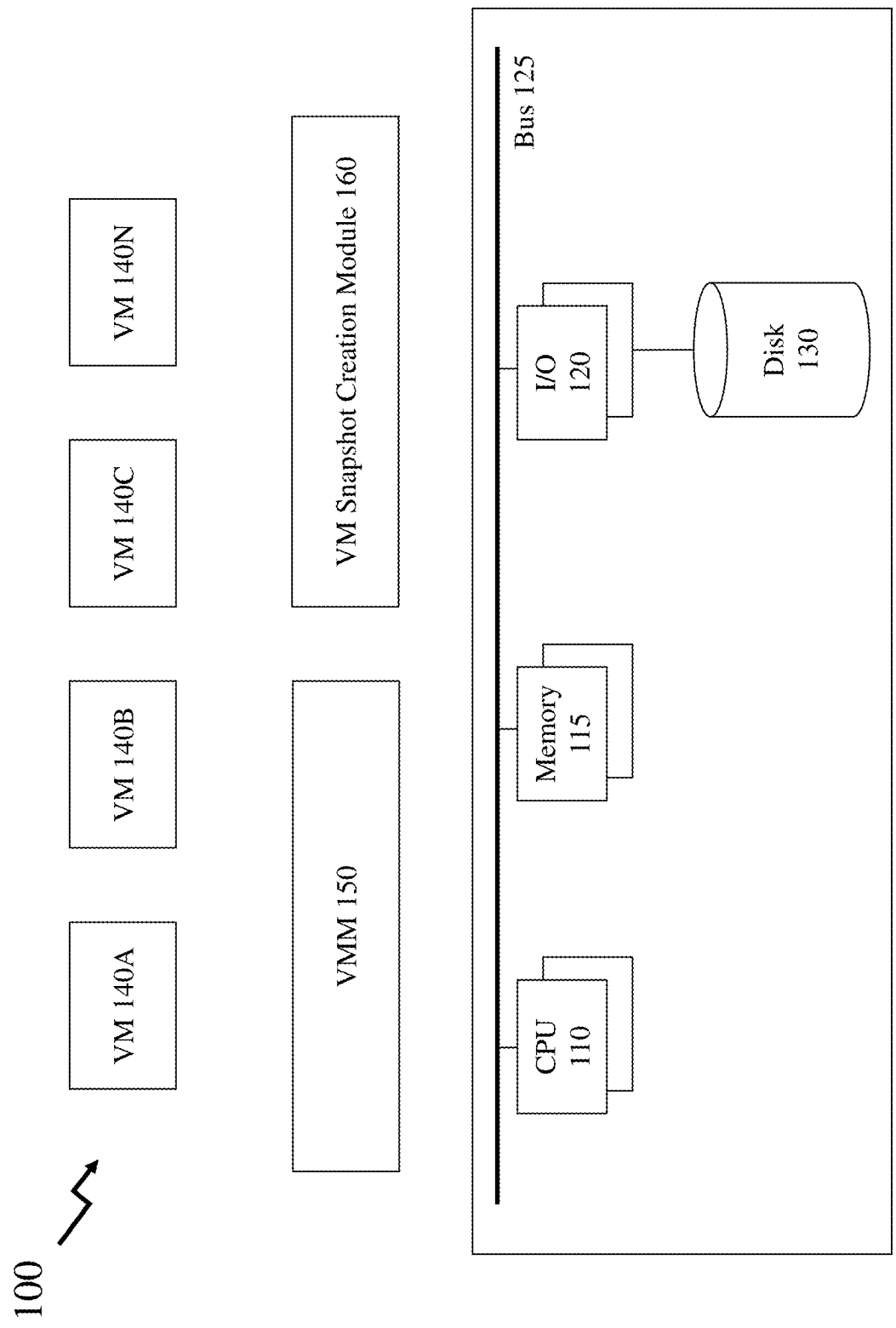
FIG. 1 depicts a high-level diagram of an example computer system 100 in which the example methods of creating virtual machine snapshots may be implemented, in accordance with one or more aspects of the present disclosure.

Described herein are systems and methods of creating virtual machine snapshots without interfering with active user sessions.

A virtual execution environment implemented by a host computer system may comprise a virtual machine monitor (VMM) facilitating execution of one or more virtual machines, each of which may run a guest OS managing one or more applications. The VMM may emulate the underlying hardware platform (e.g., the x86 platform), including emulating the processor, memory, and peripheral devices (such as network interface controllers, hard disk controllers, etc.). In various illustrative examples, the virtual execution environment may be employed for executing code that has originally been developed for platforms different from the host platform.

In certain implementations, the virtual execution environment may be implemented using hardware-assisted virtualization features of the host platform. Such hardware-assisted virtualization features may enable executing, at an elevated privilege level, a VMM that acts as a host and has the full control of the processor and other platform hardware. The VMM presents a virtual machine with an abstraction of one or more virtual processors. The virtual machine implements a software environment which may be represented by a stack including a guest operating system (OS) and application software. Each virtual machine may operate independently of other virtual machines and use the VMM-facilitated interface to the processors, memory, storage, graphics, and I/O provided by the host platform, while the VMM may retain selective control of processor resources, physical memory, interrupt management, and input/output (I/O).

"Virtual machine snapshot" herein shall refer to a non-volatile memory copy of the virtual machine state, which may include virtual processors, the virtual random access memory (RAM), disks associated with the virtual machine, virtual peripheral devices, and VMM internal structures required for guest operating system virtualization. The non-volatile memory for saving the snapshot may be provided by a disk of the host computer system, although other implementations of the non-volatile memory also fall within the scope of the disclosure.

Conventional methods of creating virtual machine snapshots may require interrupting any currently active user sessions and/or de-initializing the virtualization services in order to save the content of the virtual RAM to the disk. Such interruption and de-initialization may be undesirable, especially in situations where the virtual machine supports an interactive environment, as they would adversely affect the end user experience and the overall system efficiency. The systems and methods of the present disclosure alleviate these and other deficiencies of conventional snapshot creation methods, by utilizing a host RAM bugger for queuing the virtual memory pages, and then asynchronously saving the queued memory pages to the disk. Since the queueing operation only involves memory copying, it does not introduce any perceivable interruptions to the currently active user sessions. In order to further reduce the amount of disk I/O operations, the memory pages may be compressed before being saved to the disk.

Responsive to receiving a request to create a snapshot of a running virtual machine, the snapshot creation logic may write-protect the virtual machine memory pages, e.g., by clearing the corresponding writable flags in the paging table. The snapshot creation logic may then start queuing the virtual memory pages to a queue residing in a host RAM buffer. Responsive to successfully queueing a memory page, the page may be made writable, e.g., by setting the corresponding writable flag in the paging table. Since the queueing operation does not interfere with any currently active user sessions, this phase is referred to as synchronous (with respect to the user session).

A virtual machine's attempt to modify a write-protected virtual memory page would trigger a virtual machine (VM) exit, thus yielding the execution flow control to the VMM, which in response may append the content of the virtual memory page to the queue, make the page writable, and resume the virtual machine execution without introducing perceivable delays into any currently active user sessions. The queued virtual memory pages may then be asynchronously retrieved from the host RAM buffer and saved to the disk, thus freeing up the space in the host memory buffer for subsequent queueing of eventually modified virtual machine memory pages.

In certain implementations, the virtual memory pages may be compressed before being saved to the disk. Compressing the memory pages may reduce the amount of disk I/O operations at the cost of increasing the processor utilization. The snapshot creation logic may determine whether one or more queued memory pages should be compressed before being saved to the disk, in order to minimize the overall snapshot creation time under the current processor load.

In an illustrative example, the snapshot creation logic may employ two-stage queueing of virtual memory pages: one host RAM buffer may be utilized for saving the original memory pages, which are then compressed and saved into another host RAM buffer, for being finally saved to the disk. The compression and disk saving operations may be performed asynchronously with respect to the initial queueing of the virtual memory pages. Responsive to exhausting the queue(s), the snapshot creation process may be completed.

Thus, the systems and methods described herein represent improvements to the functionality of general purpose or specialized computing devices, by utilizing the host RAM for queuing the virtual memory pages that have been modified since the last snapshot creation, and then asynchronously saving the queued memory pages to the disk, in order to create a virtual machine snapshot, as described in more detail herein below. The systems and methods described herein may be implemented by hardware (e.g., general purpose and/or specialized processing devices, and/or other devices and associated circuitry), software (e.g., instructions executable by a processing device), or a combination thereof. While the examples presented herein describe virtual machines operating as memory accessing agents, non-virtualized memory agents also fall within the scope of this disclosure. Various aspects of the above referenced methods and systems are described in detail herein below by way of examples, rather than by way of limitation.

FIG. 1 depicts a high-level diagram of an example computer system 100 in which the methods of virtual machine snapshot creation may be implemented in accordance with one or more aspects of the present disclosure. The computer system 100 may include one or more central processing units (CPU) 110, also referred to as "processors" herein, which may be communicatively coupled to one or more memory devices 115 and one or more input/output (I/O) devices 120 via a system bus 125. In an illustrative example, an I/O device 120 may represent a disk controller that facilitated communications of CPU 110 and other components with one or more disks 130.

"Processor" herein refers to a device capable of executing instructions handling data in registers or memory, encoding arithmetic, logical, control flow, floating point or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device capable of inputting and/or outputting binary data. In an illustrative example, an I/O device may be provided by a network interface controller (MC) or a block I/O device, such as a hard disk controller.

In accordance with one or more aspects of the present disclosure, the computer system 100 may implement a virtual execution environment that is employed, e.g., for executing the code that has originally been developed for a platform which is different from the host platform. The virtual execution environment may comprise one or more virtual machines 140A-140N, each of which may run a guest OS managing one or more applications. Lifecycles of the virtual machines 140A-140N may be managed by the VMM 150. In certain implementations, the host computer system 100 may implement a virtual machine snapshot creation module 160 that may be employed to create virtual machine snapshots without interfering with active user sessions. In various illustrative examples, the virtual machine snapshot creation module 160 may be implemented as a userspace module, a kernel module, a combination thereof, or an embedded part of a complex virtualization module.

Figure 2:
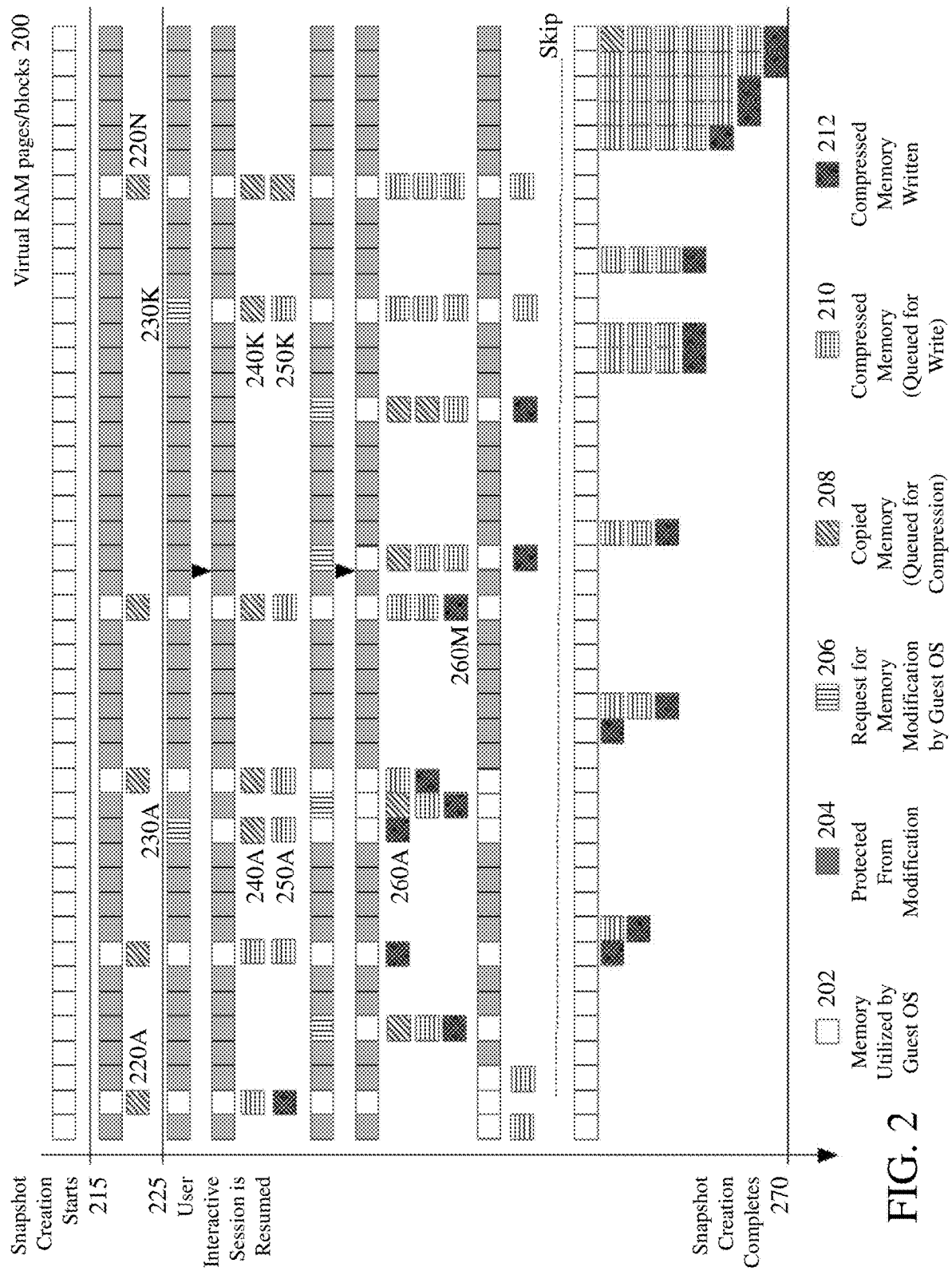
FIG. 2 schematically illustrates an example sequence of operations that may be performed by the virtual machine snapshot creation module 160 for creating a virtual machine snapshot, in accordance with one or more aspects of the present disclosure.

FIG. 2 schematically illustrates an example sequence of operations that may be performed by the virtual machine snapshot creation module 160 for creating a virtual machine snapshot. As schematically illustrated by FIG. 2, the virtual machine state may comprise a plurality of virtual memory pages 200. For at least some of the virtual memory pages 200, FIG. 2 schematically illustrates the sequence of states through which the virtual memory page is transitioning: utilized by the guest OS 202, protected from modification 204, requested to be modified by guest OS 206, queued for compression 208, compressed and queued for saving to disk 210, and saved to disk 212.

At the time 215, a new snapshot may be initiated (e.g., by a snapshot creation request). Any active user sessions may be temporarily suspended (e.g., by pausing the host processing threads emulating the virtual machine processors). While virtual processors in the suspended state cease executing guest instructions, the snapshot creation module 160 may write-protect the virtual machine memory pages 200, e.g., by clearing the corresponding writable flags in the paging table (e.g. bit R/W of page table entry in Intel x86 architecture) and/or by disabling writes to particular page using platform-specific hardware-assisted virtualization structures (like the nested page table structure of Intel EPT extension). The snapshot creation module 160 may then start queueing the virtual memory pages 220A-220N for compression. The compression queue may reside in one or more host RAM buffers (not shown in FIG. 2 for clarity and conciseness). Responsive to successfully saving to a disk, successfully compressing or successfully queueing one or more memory pages, the pages may be made writable, e.g., by setting the corresponding writable flags in the paging table and/or using platform-specific hardware-assisted virtualization features.

At the time 225, the previously suspended user sessions may be resumed (e.g., by scheduling the host processing threads emulating the virtual machine processors). Eventually, the guest OS may attempt to modify one or more write-protected memory pages 230A-230K. A virtual machine's attempt to modify a write-protected virtual memory page would trigger a virtual machine (VM) exit, thus yielding the execution flow control to the VMM, which in response may cause the snapshot creation module 160 to queue the virtual memory page 240A-240K for compression, make the page writable, and resume the virtual machine execution without introducing perceivable delays into any currently active user sessions.

Virtual memory pages that have been queued for compression 240A-240K may then be asynchronously, with respect to the queueing operation, retrieved from the compression queue, compressed, and placed into another queue for being saved to the disk (250A-250K), thus freeing up the space in the compression queue.

Virtual memory pages that have been queued for saving to disk 250A-250K may then be asynchronously, with respect to the queueing operation, retrieved from the disk queue, and saved to the disk (260A-260M), thus freeing up the space in the disk queue. In order to increase the operational efficiency, saving the virtual memory pages to the disk may be performed by a system call bypassing an input/output (I/O) cache of the host computer system. Responsive to exhausting both compression and disk queues, the snapshot creation may be completed (270).

As the term "queue" suggests, the memory pages may be retrieved from the queue in the same order in which they were initially queued, thus implementing the first in-first out (FIFO) processing strategy. In certain implementations, retrieval of the memory pages from each queue may be performed by a dedicated processing thread. In an illustrative example, queueing the pages for compression may be performed by a first processing thread, retrieving the pages from the compression queue may be performed by a second processing thread, and saving the pages to the disk may be performed by a third processing thread, so that each of those operations is performed asynchronously with respect to the other operations.

In certain implementations, the compressing thread (if compression is enabled) or the disk writing thread (if compression is disabled) may traverse the guest memory and sequentially process the guest memory pages. If the page that is currently being processed is found in the compression queue (or the disk queue if the compression is disabled), then the queued page may be used for compression or saving to disk. Alternatively, if the page is not found in the compression queue (or disk queue), the page content may be retrieved from the guest memory, compressed, and saved to disk.

In certain implementations, the snapshot creation module 160 may employ a single-stage queuing of virtual memory pages, such that all virtual memory pages are directly, without being compressed, queued to the disk queue. Alternatively, the compression operation may selectively be performed for certain memory pages based on comparing the amount of available host RAM for queueing the memory pages and the current processor utilization, in order to minimize the overall snapshot creation time under the current processor load. In an illustrative example, if the amount of available host RAM for queueing the memory pages falls below a low water threshold, the virtual memory pages should be queued for compression. In another illustrative example, if the amount of available host RAM for queueing the memory pages exceeds a high water threshold, the virtual memory pages may be saved to the disk in the uncompressed state. In yet another illustrative example, if the amount of available host RAM for queueing the memory pages exceeds the low water threshold but falls below the high water threshold, the virtual memory pages may be compressed if the current processor utilization falls below certain threshold.

Thus, responsive to detecting a modification attempt with respect to one or more virtual memory pages, the snapshot creation module 160 may determine whether to apply the compression operation to one or more memory pages based on evaluating a function of the available host RAM and the current processor utilization. Depending upon the value of the function meeting a falling below of certain threshold values, the snapshot creation module 160 may copy the virtual memory pages to the compression queue or to the disk queue.

Example methods that may be performed by the snapshot creation module 160 for creating virtual machine snapshots are described herein below with references to FIGS. 3-5.

Figure 3:
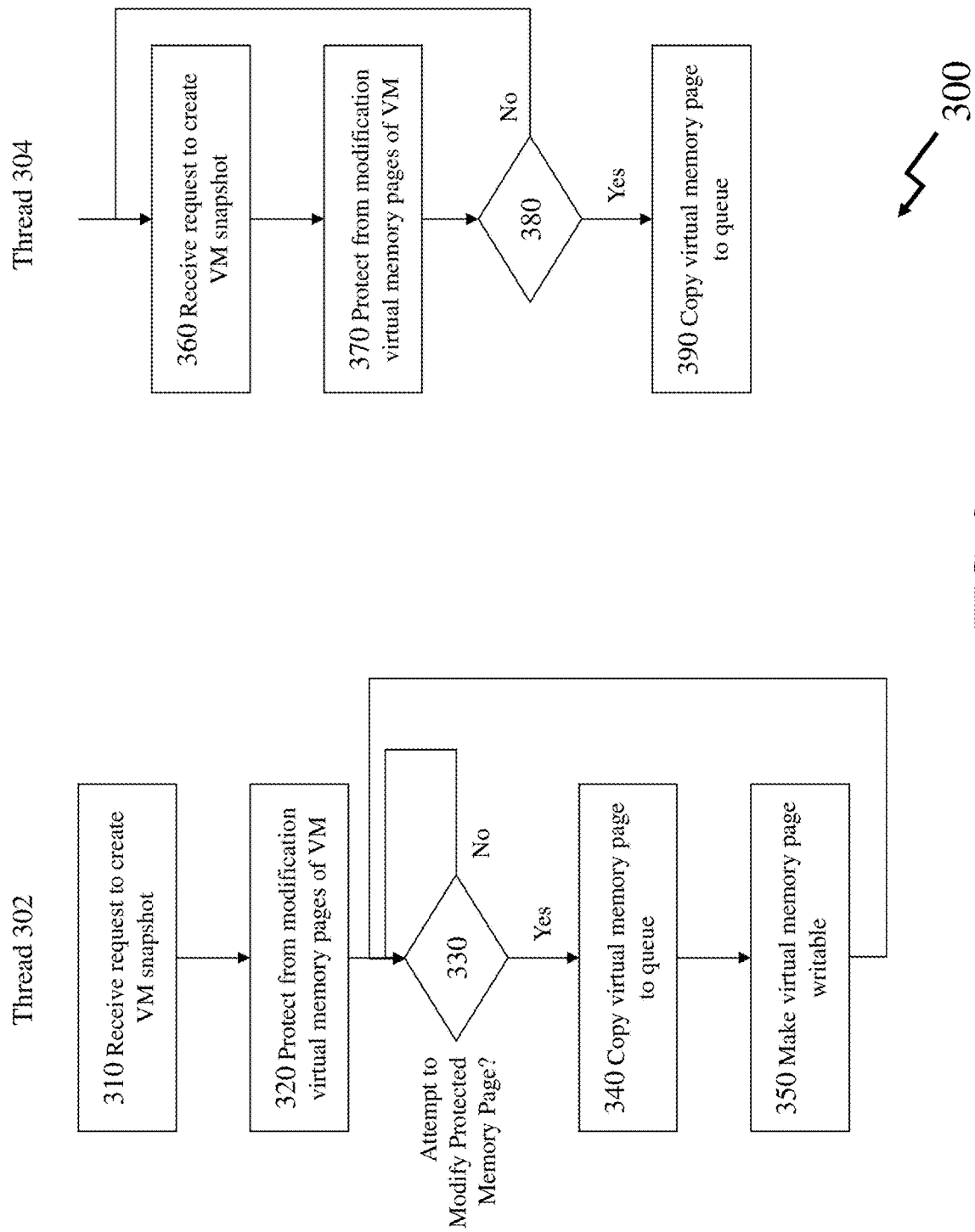

FIG. 3 depicts a flow diagram of an example method 300 of creating virtual machine snapshots, in accordance with one or more aspects of the present disclosure. The method 300 and/or each of its individual functions, routines, subroutines, or operations may be performed by one or more processing devices of the computer system (e.g., computer system 1000 of FIG. 6) implementing the method. The method 300 may be performed by two or more processing threads, each thread executing one or more individual functions, routines, subroutines, or operations of the method. In the illustrative example of FIG. 3, the first processing thread 302 performs memory page queueing operations, while the second processing thread 304 retrieves the pages from the queue. In certain implementations, the processing threads implementing the method 300 may be synchronized (e.g., using semaphores, critical sections, and/or other thread synchronization mechanisms).

The first processing thread may, at block 310, receive a request to create a snapshot of a virtual machine running on the host computer system, as described in more detail herein above.

At block 320, the first processing thread may protect from modification a plurality of virtual memory pages of the virtual machine, e.g., by clearing the corresponding writable flags in the paging table and/or using platform-specific hardware-assisted virtualization features, as described in more detail herein above.

Responsive to detecting, at block 330, an attempt to modify a virtual memory page of the plurality of memory pages, the first processing thread may, at block 340, copy the virtual memory page to a queue residing in one or more RAM buffers of the host computer system, as described in more detail herein above.

At block 350, the first processing thread may make the virtual memory page writable, e.g., by setting the corresponding writable flags in the paging table and/or using platform-specific hardware-assisted virtualization features, as described in more detail herein above.

The second processing thread may, asynchronously with respect to the queueing operations performed by the first processing thread, at block 360, retrieve the virtual memory page from the queue, as described in more detail herein above.

At block 370, the second processing thread may save the virtual memory page to a disk of the host computer system. Since the virtual memory page has been made writable immediately after having been queued, the disk saving operation does not involve interrupting the user session associated with the virtual machine, as described in more detail herein above.

Responsive to determining, at block 380, that the queue contains no pages, the second processing thread may, at block 390, complete the snapshot creation, and the method may terminate.

Figure 4:
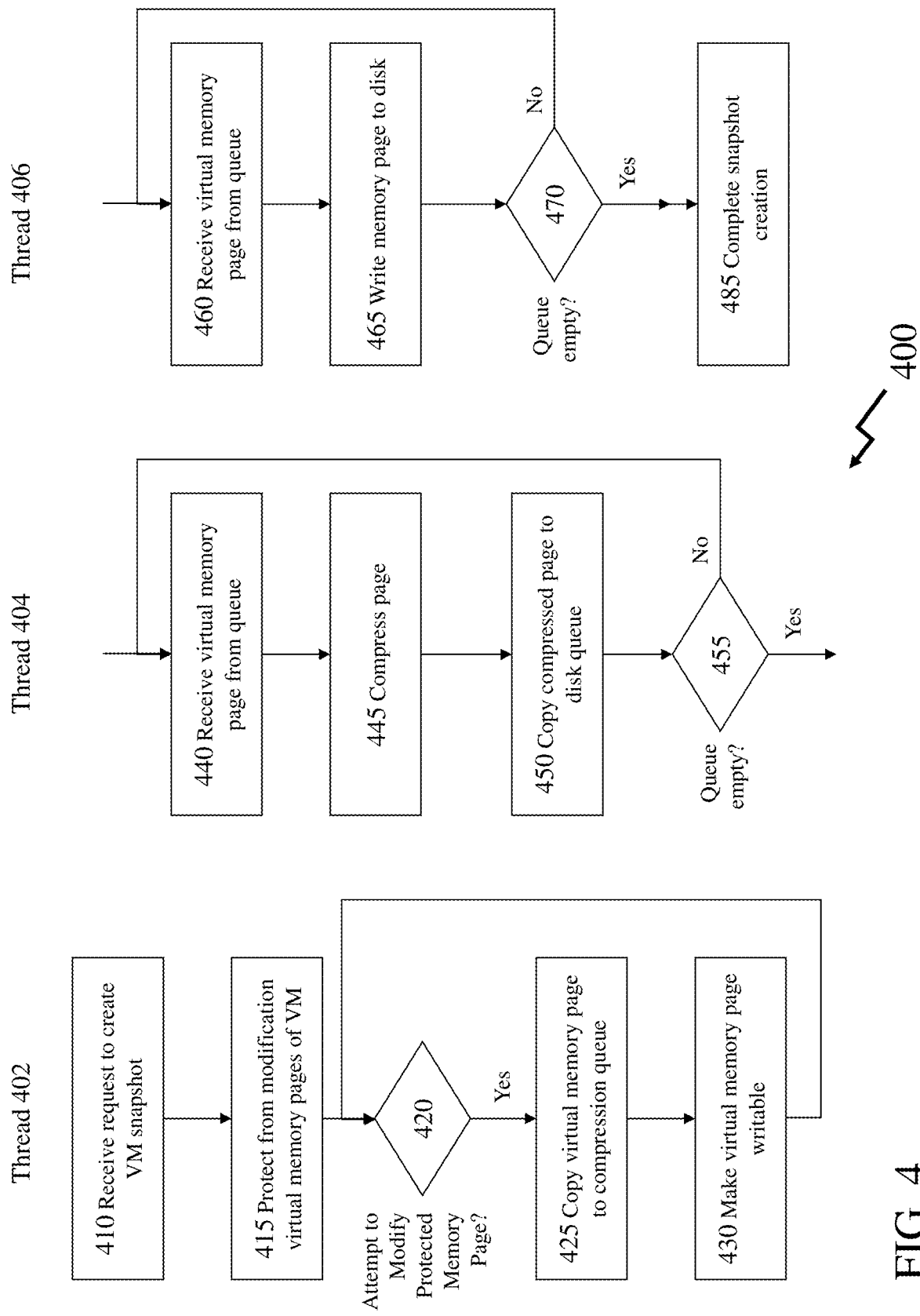

FIG. 4 depicts a flow diagram of another example method 400 of creating virtual machine snapshots, in accordance with one or more aspects of the present disclosure. The method 400 and/or each of its individual functions, routines, subroutines, or operations may be performed by one or more processing devices of the computer system (e.g., computer system 1000 of FIG. 6) implementing the method. The method 400 may be performed by two or more processing threads, each thread executing one or more individual functions, routines, subroutines, or operations of the method. In the illustrative example of FIG. 4, the first processing thread 402 performs memory page queueing operations, while the second processing thread 404 retrieves the pages from the compression queue and the third processing thread 406 retrieves the pages from the disk queue. In certain implementations, the processing threads implementing the method 400 may be synchronized (e.g., using semaphores, critical sections, and/or other thread synchronization mechanisms).

The first processing thread may, at block 410, receive a request to create a snapshot of a virtual machine running on the host computer system, as described in more detail herein above.

At block 415, the first processing thread may protect from modification a plurality of virtual memory pages of the virtual machine, e.g., by clearing the corresponding writable flags in the paging table and/or using platform-specific hardware-assisted virtualization features, as described in more detail herein above.

Responsive to detecting, at block 420, an attempt to modify a virtual memory page of the plurality of memory pages, the first processing thread may, at block 425, copy the virtual memory page to a first queue for compression. The first queue may reside in one or more RAM buffers of the host computer system, as described in more detail herein above.

At block 430, the first processing thread may make the virtual memory page writable, e.g., by setting the corresponding writable flags in the paging table and/or using platform-specific hardware-assisted virtualization features, as described in more detail herein above.

The second processing thread, asynchronously with respect to the first queueing operation, may, at block 440, retrieve the virtual memory page from the first queue, as described in more detail herein above.

At block 445, the second processing thread may compress the virtual memory page and, at block 450, place the compressed virtual memory page into a second queue for being saved to disk. The second queue may reside in one or more RAM buffers of the host computer system, as described in more detail herein above.

The third processing thread may, asynchronously with respect to the first and second queueing operations, at block 460, retrieve the compressed virtual memory page from the second queue, as described in more detail herein above.

At block 465, the third processing thread may save the compressed virtual memory page to a disk of the host computer system. Since the virtual memory page has been made writable immediately after having been queued, the disk saving operation does not involve interrupting the user session associated with the virtual machine, as described in more detail herein above.

Responsive to determining, at block 470, that both queues contain no pages, the third processing thread may, at block 475, complete the snapshot creation, and the method may terminate.

FIG. 5 depicts a flow diagram of another example method 500 of creating virtual machine snapshots, in accordance with one or more aspects of the present disclosure. The method 500 and/or each of its individual functions, routines, subroutines, or operations may be performed by one or more processing devices of the computer system (e.g., computer system 1000 of FIG. 6) implementing the method. The method 500 may be performed by two or more processing threads, each thread executing one or more individual functions, routines, subroutines, or operations of the method. In the illustrative example of FIG. 5, the first processing thread 502 performs memory page queueing operations, while the second processing thread 504 sequentially traverses the guest memory pages and retrieves the modified pages from the queue. In certain implementations, the processing threads implementing the method 500 may be synchronized (e.g., using semaphores, critical sections, and/or other thread synchronization mechanisms).

The first processing thread may, at block 510, receive a request to create a snapshot of a virtual machine running on the host computer system, as described in more detail herein above.

At block 515, the first processing thread may protect from modification a plurality of virtual memory pages of the virtual machine, e.g., by clearing the corresponding writable flags in the paging table and/or using platform-specific hardware-assisted virtualization features, as described in more detail herein above.

Responsive to detecting, at block 520, an attempt to modify a virtual memory page of the plurality of memory pages, the first processing thread may, at block 525, copy the virtual memory page to a queue residing in one or more RAM buffers of the host computer system, as described in more detail herein above.

At block 530, the first processing thread may make the virtual memory page writable, e.g., by setting the corresponding writable flags in the paging table and/or using platform-specific hardware-assisted virtualization features, as described in more detail herein above.

The second processing thread may, at block 540, asynchronously with respect to the queueing operations performed by the first processing thread, initialize the pointer of the guest memory pages to point to the start of the guest physical address space. In an illustrative example, the second processing thread may traverse the guest memory pages in the order of their respective guest physical addresses.

Responsive to determining, at block 545, that the guest memory page identified by the current value of the pointer is found in the queue, the second processing thread may, at block 550, retrieve the content of the memory page from the queue; otherwise, at block 555, the second processing thread may retrieve the content of the memory page from the guest memory.

At block 560, the second processing thread may save the virtual memory page to a disk of the host computer system. In certain implementations, the disk saving operation may be preceded by compressing the content of the memory page, as described in more details herein above. Since the virtual memory page has been made writable immediately after having been queued, the disk saving operation does not involve interrupting the user session associated with the virtual machine, as described in more detail herein above.

At block 565, the second processing thread may increment the pointer employed to traverse the guest memory pages. In an illustrative example, the value of the pointer may be increased by the size of the guest memory page.

Responsive to determining, at block 570, that the guest address space has not yet been exhausted (e.g., that the value of the pointer falls short of the maximum value of the guest physical address), the method may loop back to block 545; otherwise, at block 575, the second processing thread may complete the snapshot creation, and the method may terminate.

Figure 6:
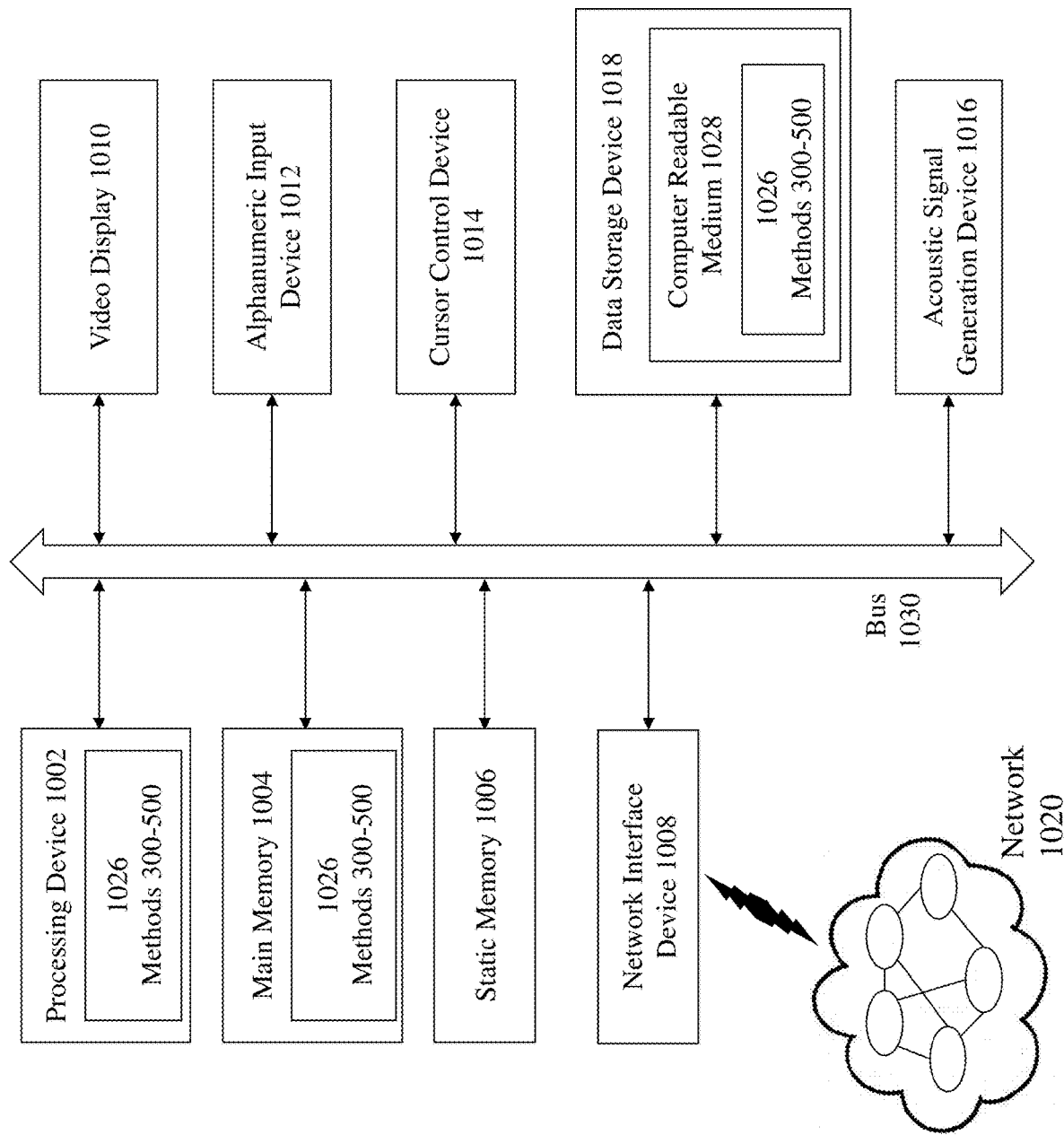
FIG. 6 depicts a block diagram of an example computer system operating in accordance with one or more aspects of the present disclosure.

FIG. 6 schematically illustrates a component diagram of an example computer system 1000 which may perform any one or more of the methods described herein. In various illustrative examples, the computer system 1000 may represent the example computer system 100 of FIG. 1.

The example computer system 1000 may be connected to other computer systems in a LAN, an intranet, an extranet, and/or the Internet. The computer system 1000 may operate in the capacity of a server in a client-server network environment. The computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

The computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 1002 may be configured to execute instructions implementing the methods 300-500 of processing virtual machine I/O requests by virtualization extension modules.

The computer system 1000 may further comprise a network interface device 1008, which may be communicatively coupled to a network 1020. The computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

The data storage device 1018 may include a computer-readable storage medium (or more specifically a non-transitory computer-readable storage medium) 1028 on which is stored one or more sets of executable instructions 1026. In accordance with one or more aspects of the present disclosure, the executable instructions 1026 may comprise executable instructions encoding various functions of the methods 300-500 of creating virtual machine snapshots.

The executable instructions 1026 may also reside, completely or at least partially, within the main memory 1004 and/or within the processing device 1002 during execution thereof by the computer system 1000, the main memory 1004 and the processing device 1002 also constituting computer-readable storage media. The executable instructions 1026 may further be transmitted or received over a network via the network interface device 1008.

While the computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising: executing a set of executable instructions stored within one or more memories which, when executed by one or more processors, cause the one or more processors to:
   determine whether a request to create the snapshot of the virtual machine is generated, upon a positive determination protect from modification a plurality of virtual memory pages of the virtual machine;
   determine whether an attempt to modify a virtual memory page of the plurality of virtual memory pages is made, and upon a positive determination execute a process comprising the steps of:
   triggering a virtual machine exit;
   appending the virtual memory page of the plurality of virtual memory pages to a queue of queued virtual memory pages;
   and resuming execution of the virtual machine.

2. The method according to claim 1, wherein
the queue is stored within a random access memory (RAM); and
the process further comprises the steps of:
   making the virtual memory page of the plurality of memory pages writable; and
   writing the queued virtual memory pages to a disk.

3. The method according to claim 1, wherein
the queue is stored within a random access memory (RAM) of the host computer system;
the process further comprises the steps of:
   making the virtual memory page of the plurality of memory pages writable; and
   writing the queued virtual memory pages to a disk of the host computer system; and
creation of the snapshot of the virtual machine is complete upon exhaustion of the queue.

4. The method according to claim 1, wherein
the queue is stored within a random access memory (RAM);
the process further comprises the steps of:
   making the virtual memory page of the plurality of memory pages writable;
   determining whether a value of a function of RAM available and current processor utilization falls below a threshold value;
   upon a positive determination the queue of queued virtual pages is a compression queue whose content is compressed prior to being written to a disk; and
   upon a negative determination the queue of queued virtual pages is a disk queue whose content is written directly to disk.

5. The method according to claim 1, wherein
appending the virtual memory page of the plurality of virtual memory pages to a queue of queued virtual memory pages comprises storing the virtual memory page of the plurality of virtual memory pages within a first queue residing within random access memory (RAM);
the process further comprises the steps of:
   making the virtual memory page of the plurality of memory pages writable;
   copying the first queue to a second queue also residing in the RAM; and
   writing the second queue to a disk of the host computer system.

6. The method according to claim 1, wherein
appending the virtual memory page of the plurality of virtual memory pages to a queue of queued virtual memory pages comprises storing the virtual memory page of the plurality of virtual memory pages within a first queue residing within random access memory (RAM);
the process further comprises the steps of:
   making the virtual memory page of the plurality of memory pages writable;
   copying the stored virtual memory pages within the first queue to a second queue also residing in the RAM; and
   writing the stored virtual memory pages in the second queue to a disk of the host computer system; and
the writing of the stored virtual pages to the first queue and retrieval of the stored virtual pages from the first queue are performed asynchronously.

7. The method according to claim 1, further comprising initializing a pointer to a start of a guest physical address space;
executing another process comprising the steps of:
   determining whether a guest memory page identified by a current value of the pointer is found within the queue;
   upon a positive determination retrieving a stored virtual memory page corresponding to the guest memory page from the queue;
   upon a negative determination retrieving the guest memory page from a guest memory;

storing the one of the retrieved virtual memory page and retrieved guest memory page within a disk of the host system; and incrementing the pointer by the size of the guest memory page;

determining whether the pointer exceeds a maximum value of a guest physical address;

upon a positive determination completing the creation of the virtual machine snapshot; and upon a negative determination executing the another process again.

8. The method according to claim 1, further comprising making the virtual memory page of the plurality of memory pages writable; and executing another process asynchronously with respect to the process comprising the steps:

initializing a pointer to a start of a guest physical address space;

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

storing the one of the retrieved virtual memory page and retrieved guest memory page within a disk of the host system; and incrementing the pointer by the size of the guest memory page;

determining whether the pointer exceeds a maximum value of a guest physical address;

upon a positive determination completing the creation of the virtual machine snapshot; and upon a negative determination executing the second process again.

9. The method according to claim 1, wherein initializing a pointer to a start of a guest physical address space;

executing another process comprising the steps of:

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

compressing the one of the retrieved virtual memory page and retrieved guest memory page;

storing the compressed one of the retrieved virtual memory page and retrieved guest memory page within a disk of the host system; and incrementing the pointer by the size of the guest memory page;

determining whether the pointer exceeds a maximum value of a guest physical address;

upon a positive determination completing the creation of the virtual machine snapshot; and upon a negative determination executing the another process again.

10. The method according to claim 1, wherein initializing a pointer to a start of a guest physical address space;

executing another process asynchronously with respect to the process comprising the steps:

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

compressing the one of the retrieved virtual memory page and retrieved guest memory page;

storing the compressed one of the retrieved virtual memory page and retrieved guest memory page within a disk of the host system; and incrementing the pointer by the size of the guest memory page;

determining whether the pointer exceeds a maximum value of a guest physical address;

upon a positive determination completing the creation of the virtual machine snapshot; and upon a negative determination executing the another process again.

11. A non-transitory computer-readable storage medium comprising executable instructions that, when executed by one or more processors, cause the one or more processors to:

determine whether a request to create the snapshot of the virtual machine is generated, upon a positive determination protect from modification a plurality of virtual memory pages of the virtual machine;

determine whether an attempt to modify a virtual memory page of the plurality of virtual memory pages is made, and upon a positive determination execute a process comprising the steps of:

triggering a virtual machine exit;

appending the virtual memory page of the plurality of virtual memory pages to a queue of queued virtual memory pages;

and resuming execution of the virtual machine.

12. The non-transitory computer-readable storage medium according to claim 11, wherein the queue is stored within a random access memory (RAM); and the executable instructions further cause the one or more processors to:

make the virtual memory page of the plurality of memory pages writable; and write the queued virtual memory pages to a disk.

13. The non-transitory computer-readable storage medium according to claim 11, wherein the queue is stored within a random access memory (RAM) of the host computer system;

the executable instructions further cause the one or more processors to:

make the virtual memory page of the plurality of memory pages writable; and write the queued virtual memory pages to a disk of the host computer system; and creation of the snapshot of the virtual machine is complete upon exhaustion of the queue.

14. The non-transitory computer-readable storage medium according to claim 11, wherein the queue is stored within a random access memory (RAM);

the executable instructions further cause the one or more processors to:

make the virtual memory page of the plurality of memory pages writable;

determine whether a value of a function of RAM available and current processor utilization falls below a threshold value;

upon a positive determination the queue of queued virtual pages is a compression queue whose content is compressed prior to being written to a disk; and upon a negative determination the queue of queued virtual pages is a disk queue whose content is written directly to disk.

15. The non-transitory computer-readable storage medium according to claim 11, wherein appending the virtual memory page of the plurality of virtual memory pages to a queue of queued virtual memory pages comprises storing the virtual memory page of the plurality of virtual memory pages within a first queue residing within random access memory (RAM);

the executable instructions further cause the one or more processors to:

make the virtual memory page of the plurality of memory pages writable;

copy the first queue to a second queue also residing in the RAM; and write the second queue to a disk of the host computer system.

16. The non-transitory computer-readable storage medium according to claim 11, wherein appending the virtual memory page of the plurality of virtual memory pages to a queue of queued virtual memory pages comprises storing the virtual memory page of the plurality of virtual memory pages within a first queue residing within random access memory (RAM);

the executable instructions further cause the one or more processors to:

make the virtual memory page of the plurality of memory pages writable;

copy the stored virtual memory pages within the first queue to a second queue also residing in the RAM; and write the stored virtual memory pages in the second queue to a disk of the host computer system; and the writing of the stored virtual pages to the first queue and retrieval of the stored virtual pages from the first queue are performed asynchronously.

17. The non-transitory computer-readable storage medium according to claim 11, wherein the executable instructions further cause the one or more processors to:

initialize a pointer to a start of a guest physical address space;

execute a process comprising the steps of:

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

storing the one of the retrieved virtual memory page and retrieved guest memory page within a disk of the host system; and incrementing the pointer by the size of the guest memory page;

determine whether the pointer exceeds a maximum value of a guest physical address;

upon a positive determination complete the creation of the virtual machine snapshot; and upon a negative determination execute the another process again.

18. The non-transitory computer-readable storage medium according to claim 11, wherein the executable instructions further cause the one or more processors to:

make the virtual memory page of the plurality of memory pages writable; and execute a process asynchronously with respect to the process comprising the steps:

initializing a pointer to a start of a guest physical address space;

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

storing the one of the retrieved virtual memory page and retrieved guest memory page within a disk of the host system; and incrementing the pointer by the size of the guest memory page;

determining whether the pointer exceeds a maximum value of a guest physical address;

upon a positive determination completing the creation of the virtual machine snapshot; and upon a negative determination executing the second process again.

19. The non-transitory computer-readable storage medium according to claim 11, wherein the executable instructions further cause the one or more processors to:

initialize a pointer to a start of a guest physical address space;

execute a process comprising the steps of:

determining whether a guest memory page identified by a current value of the pointer is found within the queue;

upon a positive determination retrieving a stored virtual memory page corresponding to the guest memory page from the queue;

upon a negative determination retrieving the guest memory page from a guest memory;

compressing the one of the retrieved virtual memory page and retrieved guest memory page;

storing the compressed one of the retrieved virtual memory page and retrieved guest memory page within a disk of the host system; and incrementing the pointer by the size of the guest memory page;

determine whether the pointer exceeds a maximum value of a guest physical address;

upon a positive determination completing the creation of the virtual machine snapshot; and upon a negative determination executing the another process again.

20. The non-transitory computer-readable storage medium according to claim 11, wherein the executable instructions further cause the one or more processors to:

initialize a pointer to a start of a guest physical address space;

execute a process asynchronously comprising the steps:
  determining whether a guest memory page identified by a current value of the pointer is found within the queue;
  upon a positive determination retrieving a stored virtual memory page corresponding to the guest memory page from the queue;
  upon a negative determination retrieving the guest memory page from a guest memory;
  compressing the one of the retrieved virtual memory page and retrieved guest memory page;
  storing the compressed one of the retrieved virtual memory page and retrieved guest memory page within a disk of the host system; and
  incrementing the pointer by the size of the guest memory page;
determining whether the pointer exceeds a maximum value of a guest physical address;
upon a positive determination completing the creation of the virtual machine snapshot; and
upon a negative determination executing the another process again.

\* \* \* \* \*